United States Patent
Xu et al.

(10) Patent No.: US 12,316,378 B2
(45) Date of Patent: May 27, 2025

(54) OPTICAL HIGH-POWER AMPLIFIER CIRCUIT WITH SWITCHABLE POLARIZED OUTPUT STATE

(71) Applicant: The Boeing Company, Arlington, VA (US)

(72) Inventors: Yuanjian Xu, Thousand Oaks, CA (US); James Franklin, Manhattan Beach, CA (US); Brian K. Pheiffer, Palos Verdes Estates, CA (US); Stephen G. Lambert, Maryland Heights, MO (US)

(73) Assignee: The Boeing Company, Arlington, VA (US)

( * ) Notice: Subject to any disclaimer, the term of this patent is extended or adjusted under 35 U.S.C. 154(b) by 246 days.

(21) Appl. No.: 18/154,491

(22) Filed: Jan. 13, 2023

(65) Prior Publication Data

US 2024/0243810 A1 Jul. 18, 2024

(51) Int. Cl.
| | |
|---|---|
| H04B 10/291 | (2013.01) |
| H04B 7/185 | (2006.01) |
| H04B 10/118 | (2013.01) |
| H04B 10/532 | (2013.01) |
| H04J 14/06 | (2006.01) |

(52) U.S. Cl.
CPC ....... H04B 10/118 (2013.01); H04B 7/18513 (2013.01); H04B 7/18515 (2013.01); H04B 10/291 (2013.01); H04B 10/532 (2013.01); H04J 14/06 (2013.01)

(58) Field of Classification Search
CPC ..... H04B 10/29; H04B 10/291; H04B 10/293
See application file for complete search history.

(56) References Cited

U.S. PATENT DOCUMENTS

| | | | |
|---|---|---|---|
| 5,636,053 A * | 6/1997 | Pan | H01S 3/10023 359/337 |
| 9,036,253 B2 | 5/2015 | Esener et al. | |
| 11,063,406 B1 | 7/2021 | Barwicz et al. | |
| 2003/0021514 A1* | 1/2003 | Ito | H04B 10/2569 359/332 |
| 2012/0050846 A1* | 3/2012 | Akasaka | H04B 10/293 359/344 |
| 2021/0194218 A1* | 6/2021 | Le Taillandier De Gabory | H04B 10/2931 |
| 2022/0045766 A1 | 2/2022 | Le | |

* cited by examiner

*Primary Examiner* — Nathan M Cors
(74) *Attorney, Agent, or Firm* — Harrity & Harrity, LLP

(57) ABSTRACT

An optical high-power amplifier ("OPHA") circuit, e.g., for a spaceborne satellite-based communication network, includes fiberoptic gain and polarization maintenance ("PM") stages, a polarization splitter, first and second photodetectors, and an electronic control unit ("ECU"). The gain stage outputs an amplified optical signal in response to a low-power ("LP") optical input signal. The PM stage outputs separate high and low power output signals in response to the amplified signal. A majority of power of the input signal is allocated to the HP output signal. The polarization splitter transmits the LP output signal along the slow and/or fast polarization axis. The photodetectors are arranged on the slow and fast axes. The ECU outputs a polarizer control signal to a polarization rotator device in response to electrical signals from one or both photodetectors to command the rotator device to output the LP optical input signal with a targeted polarized output state.

20 Claims, 2 Drawing Sheets

OPTICAL HIGH-POWER AMPLIFIER CIRCUIT WITH SWITCHABLE POLARIZED OUTPUT STATE

STATEMENT OF GOVERNMENT INTEREST

This invention was made with Government support under HR00112290039 awarded by the Defense Advanced Research Projects Agency (DARPA). The Government has certain rights in this invention.

BACKGROUND

Optical communication is the art of generating, transmitting, detecting, and processing light. Visible or infrared laser diodes, for instance, are widely used as light sources for quickly and securely communicating information over extended distances. In a telecommunications network, for example, multiple transceiver points or "nodes" are configured to transmit and receive information using light pulses. Optical modulation is used to encode the information into light waves, which are then transmitted by a transmitting node to one or more receiving nodes over a suitable intervening medium, e.g., an optical fiber cable, through free space, or via another transparent signal transmission medium.

With respect to space-based/spaceborne telecommunication networks in particular, digital signal processing techniques are often used in satellite communications. Each satellite functions as a node within a given orbiting network. Due to physical separation of the various nodes, signals transmitted or relayed between separated nodes propagates over extended line-of-sight distances. As a result, a signal when received by a receiving node often has low remaining signal power relative to an initial power level of the signal at the transmitting node.

To address this issue, the various nodes of an optical communication network may be equipped with optical amplifier circuits. Such optical amplifier circuits are controlled to selectively amplify a received signal at a given node. The optical amplifiers are typically required to provide high optical power in order to be able to close a communication link. Often, polarized optical output is required from a transmitting node. However, existing optical amplifiers are single polarization amplifiers, and thus cannot be used for different polarization inputs. Moreover, their output polarization is fixed.

SUMMARY

The present disclosure relates to an optical high-power amplifier (OPHA) circuit for use in a myriad of possible terrestrial, airborne, or spaceborne applications. In an exemplary use scenario, the OPHA circuit may be hosted aboard a node of a multi-node communication network, e.g., a communication satellite used as part of an orbiting constellation of similarly configured communication satellites. The OPHA circuit described herein may be controlled to maintain a fixed output polarization state in one or more embodiments. In other embodiments, the OPHA circuit can provide a switchable output polarization state for improved security. Unlike existing approaches which are not equipped to handle the characteristically high power levels contemplated herein, and which are also not typically switchable to achieve different output polarization states as noted above, the present technical solutions are uniquely tailored to handle high power levels with low signal losses. One or more representative embodiments also permit output polarization switching.

As the capabilities of satellites employed as constituent nodes of an orbiting network will vary with the intended application thereof, the terms "low-power" and "high-power" as used herein likewise have an application-specific meaning. As a non-limiting example, for instance, "low-power" unless otherwise specified herein may refer to milliwatt (mW) power levels, e.g., below about 100 mW. The term "high-power" for its part may encompass power levels substantially exceeding such low-power levels, for instance about 500 mW to tens of Watts or more.

In a particular non-limiting embodiment of the present disclosure, an OPHA circuit includes a fiberoptic gain stage, a polarization maintenance ("PM") stage (or stages), a polarization splitter, first and second photodetectors, and an electronic control unit ("ECU"). The gain stage is configured to output an amplified optical signal having a total power level, which occurs in response to a low-power ("LP") optical input signal. The PM stage is configured to output a high-power ("HP") optical output signal and a split portion of the LP optical signal. This occurs in response to the amplified output signal, with a majority of the total power level being allocated to the HP optical output signal and a minority of the total power level being allocated to the LP optical signal. The polarization splitter in this embodiment is configured to transmit the LP optical signal along a slow polarization axis and/or a fast polarization axis.

The first and second photodetectors, which are arranged on the slow polarization axis and the fast polarization axis, respectively, are configured to output corresponding first and second input signals in response to the LP optical signal. As part of this exemplary embodiment, the ECU outputs a control signal to the polarization rotator device in response to at least one of the first or second electrical input signals. In this manner, the ECU commands the polarization rotator device to output the amplified optical signal with a targeted polarized output state.

Another aspect of the disclosure includes a method for controlling the above-summarized OPHA circuit. An embodiment the method includes outputting an amplified optical signal having a total power level, via a fiberoptic gain stage, in response to an LP optical input signal. The method may also include transmitting an HP optical output signal and the LP optical signal, via the PM stage in response to the amplified output signal, such that a majority of the total power level is allocated to the HP optical output signal and a minority of the total power level is allocated to the LP optical signal.

The method according to this exemplary implementation may further include transmitting the LP optical signal, via a polarization splitter, along a slow polarization axis and/or a fast polarization axis, as well as outputting corresponding first and second input signals in response to the LP optical signal via respective first and second photodetectors arranged on the slow polarization axis and the fast polarization axis. As part of the method, an ECU may command, in response to at least one of the first or second electrical input signals, a polarization rotator device to output the amplified optical signal with a targeted polarized output state.

A satellite is also described herein. An embodiment of the satellite includes a satellite body and an OPHA circuit connected thereto. The OPHA circuit in this particular configuration includes a polarization rotator device and a fiberoptic gain stage, the latter of which alone or in combination with the polarization rotator device is configured to receive an LP optical input signal from an external modulator or laser. In response to the LP optical signal, the fiberoptic gain stage outputs an amplified optical signal having a total power level.

The OPHA circuit of the satellite in this embodiment also includes a PM stage configured to output HP and LP optical signals in response to the amplified output signal, such that a majority of the total power level is allocated to the HP optical output signal and a minority of the total power level is allocated to the LP optical signal. The PM stage includes a PM tap coupler or a PM wavelength division multiplexer (PM-WDM). The OPHA circuit in this exemplary construction of the satellite further includes a polarization splitter configured to transmit the LP optical signal along a slow polarization axis and/or a fast polarization axis, and first and second photodetectors arranged on the slow polarization axis and the fast polarization axis, respectively.

The first and second photodetectors are configured to output corresponding first and second electrical input signals in response to the LP optical signal. An ECU hosted aboard the satellite outputs a control signal to the polarization rotator device using the first electrical input signal as a default input signal, and using the second electrical input signal in response to an error in or a lack of availability of the first electrical input signal. In this manner, the ECU commands the polarization rotator device to output the amplified optical signal with a targeted polarized output state, which the ECU is configured to selectively modify as needed.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

Figure 1:
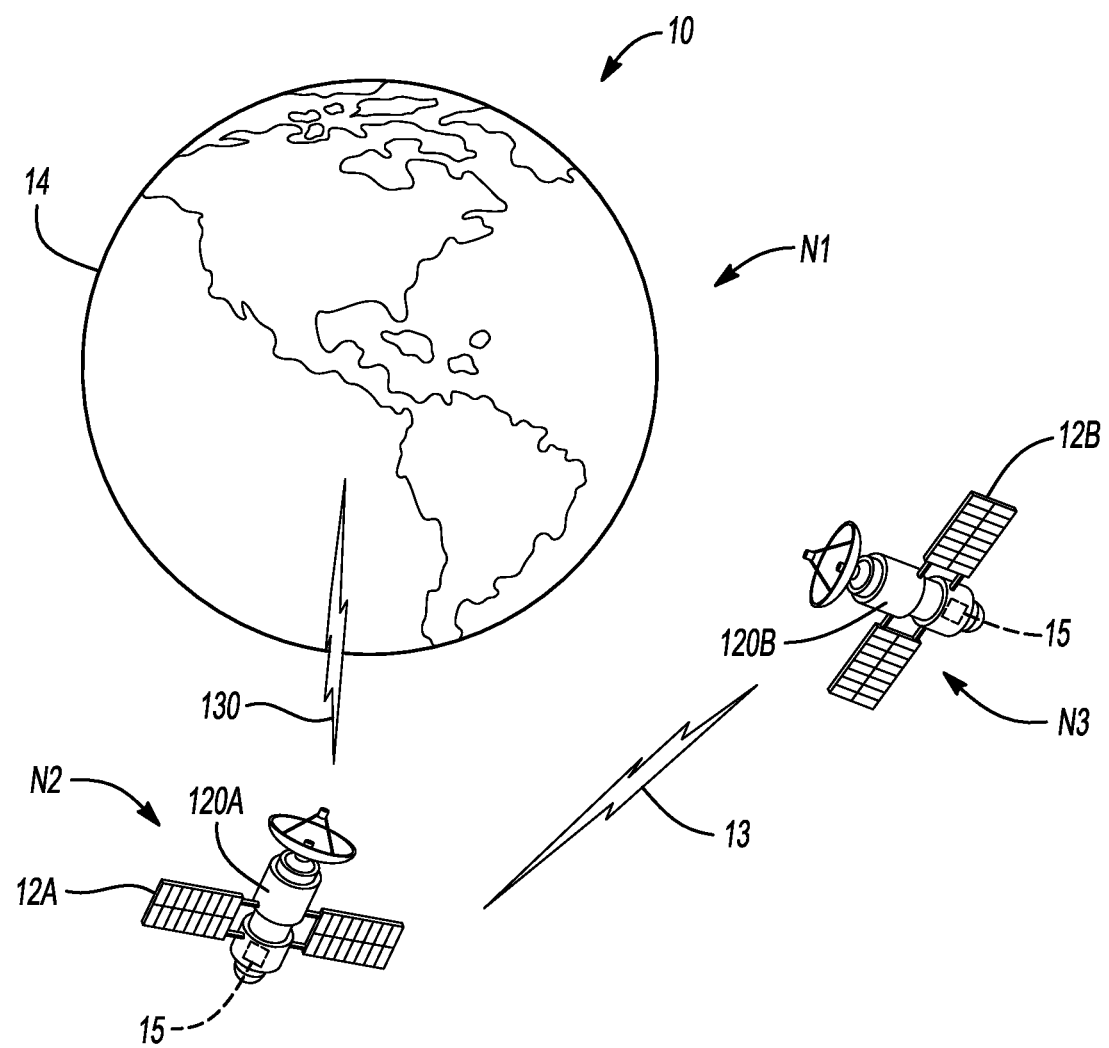
FIG. 1 illustrates a representative optical communication network having constituent nodes in the exemplary form of Earth-orbiting satellites in accordance with an aspect of the disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are illustrative examples, and that other embodiments can take various and alternative forms. The Figures are not necessarily to scale and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the drawings, wherein like reference numbers refer to the same or like components in the several Figures, an optical communication network 10 in accordance with one or more embodiments of the disclosure includes multiple communication nodes, with representative nodes N1, N2, and N3 shown in FIG. 1 for illustrative simplicity. At least some of the various nodes N1, N2, and N3 are equipped with an optical high-power amplifier ("OHPA") circuit 15 configured as set forth in detail below, e.g., as the exemplary OHPA circuit 150 of FIG. 2. Within the scope of the present disclosure, the OHPA circuit 15 may be configured as or for use aboard a corresponding communication node of the optical communication network 10, e.g., either or both of the nodes N2 and N3. A remote node, for instance a remotely-located communication node N3 in an exemplary scenario in which modulated information 13 is transmitted through free space as an optical signal from node N2 to node N3, may be similarly configured as another communication node of the optical communication network 10.

As shown in FIG. 1, the optical communication network 10 may be optionally constructed as a spaceborne or orbiting communication network. In such an embodiment, the representative communication nodes N2 and N3 may be hosted by or located aboard respective satellites 12A and 12B. The satellites 12A and 12B, each of which includes a corresponding satellite body 120A and 120B, may be configured for use as part of a constellation of government or commercial platforms. Such platforms in turn may be equipped for delivering, e.g., digital communications, broadband internet connectivity, streaming entertainment, etc. A corresponding one of the OHPA circuits 15 may be connected to each of the satellite bodies 120A and 120B, thereby enabling performance at the nodes N2 and N3 of the various functions described below with reference to FIGS. 2 and 3.

Ongoing tracking and flight control operations of the satellites 12A and 12B in the non-limiting embodiment of FIG. 1 can be established and maintained using a network of ground stations (not shown), e.g., when the satellites 12A and 12B orbit the Earth 14 or another planetary body such as the moon, an asteroid, Mars or another planet, etc. For example, a given ground station used as part of the optical communication network 10 could operate as the communication node N1, or an additional satellite (not shown) could perform this function.

For illustrative simplicity and consistency, node N2 of FIG. 1 will be described hereinbelow as functioning as a transmitting node during a representative exchange of the information 13. Node N3 in this exemplary scenario functions as the receiving node, i.e., receiving the transmitted information 13 from node 2, without limiting information exchanges to such an arrangement. In this case, node N2, i.e., the satellite 12A, is in remote optical communication with nodes N1 and N3, either of which could be embodied as an external modulator or an external laser, e.g., a high-power laser diode or array thereof suitable for free-space optical communications ("FSOC"). For instance, information 130 may be transmitted to node N2/satellite 12A from one or more nodes N1/ground stations located on the surface of the Earth 14, with such ground stations possibly communicating with satellite phones, cellular phones, tablet computers, landlines, gateways, network control centers, and other possible devices. Node N2 then relays or retransmits the information 130 to the remote node N3 after first processing the information 130 via the OHPA circuit 15 described below.

As appreciated in the art, orbiting satellites such as the representative satellites 12A and 12B of FIG. 1 orbit the Earth 14 within a dedicated elliptical or circular orbital path, e.g., Low-Earth Orbit (LEO) or Geosynchronous Orbit (GEO). The satellites 12A and 12B of the simplified illustrative embodiment of FIG. 1 in turn are spaced far apart from each other. Although laser-based communication through free space employs a narrower beamwidth than, e.g., typical radio frequency ("RF") signals, optical inter-satellite links ("OISL") of the types exemplified in FIG. 1 require highly precise beam steering control and directional hardware. Additionally, power levels associated with modern OISL communications typically exceed the capabilities of terrestrial optical amplifier circuitry. In order solve this problem and also provide the capability of selectively switching between polarization states to achieve a target polarization state, the satellites 12A and 12B and possibly other satellites of the optical communication network 10 may be equipped with the OHPA circuit 15, an embodiment of which will now be described with reference to FIG. 2.

Figure 2:
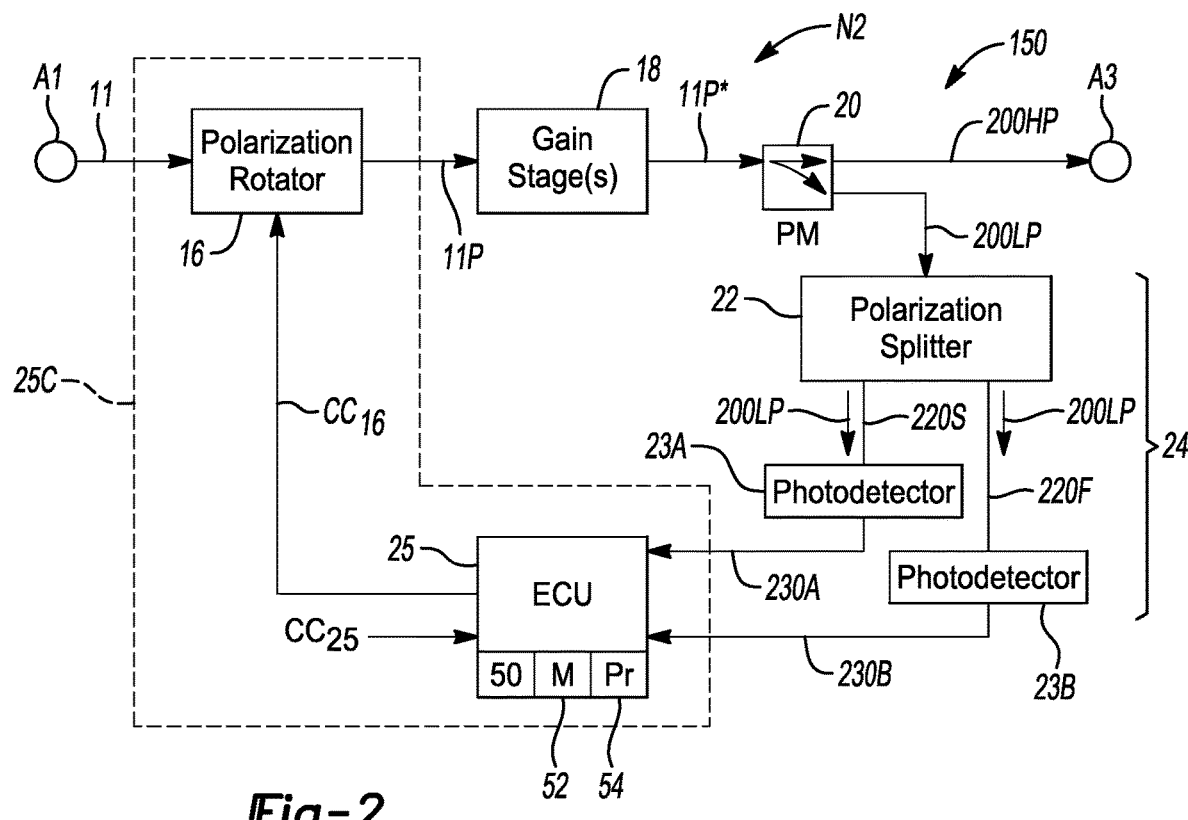
FIG. 2 is a circuit flow diagram describing a representative implementation of an optical high-power amplifier (OHPA) circuit usable aboard the various communication nodes of FIG. 1 or in other optical communication networks.

Referring to FIG. 2, the OHPA circuit 15 implemented in FIG. 1 is depicted as an OHPA circuit 150 in accordance with a possible embodiment. As noted above, the OHPA circuit 150 may be used as part of any of the nodes of the optical communication network 10, with node N2 being the host location in the non-limiting implementation of FIG. 2. A signal source component A1, e.g., a modulator or external laser, transmits information in an optical form as a low-power (LP) optical input signal 11. As appreciated in the art, optical signals are received at node N2 in low power due to extended distance between satellites, or between ground and the satellites. The received optical signals are processed in the satellite(s), and some or all the processed information/signals are then modulated onto the LP optical input signal 11 High optical power (200HP) is transmitted through an optical telescope A2. The extended distance between nodes N1 and N2 and resulting signal attenuation would ensure that the received signals at node N2 are low power. Thus, the notations "LP" is used herein to indicate the relatively low power level.

The ECU 25 and a polarization rotator device 16 in one or more embodiments may together form a polarization circuit 25C. The ECU 25 ultimately controls a state of the polarization rotator device 16 via a polarizer control signal ($CC_{16}$), e.g., a voltage or current signal. As appreciated by those skilled in the art, a polarization rotator such as the representative polarization rotator device 16 of FIG. 2 is an optical device operable for physically rotating the polarization axis of a linearly-polarized laser beam, in this case the LP optical input signal 11. Such rotation of the polarization rotator device 16 of FIG. 2 is controlled herein by the ECU 25 to achieve a desired polarized output state. Based on Fresnel rhombs, i.e., prisms that behave optically as quarter waveplates, a typical polarization rotator will produce a phase change between the two orthogonal linear polarization states, i.e., the p-polarized and s-polarized states, as appreciated in the art.

The LP optical input signal 11 thus arrives at the polarization rotator device 16 along with the polarizer control signal ($CC_{16}$), with the polarization rotator device 16 responding to the polarizer control signal ($CC_{16}$) by outputting an LP optical input signal 11P. In this instance, the suffix "P" is used to indicate that the LP optical input signal 11 now has an established polarization state, as commanded by the ECU 25.

Also included in the exemplary OHPA circuit 150 shown in FIG. 2 is a fiberoptic gain stage 18 and a polarization maintenance ("PM") stage 20. The fiberoptic gain stage 18 is configured, in response to receipt of the LP optical input signal 11P from the polarization rotator device 16, to output an amplified optical signal 11P* having a total power level. As appreciated by those skilled in the art, the fiberoptic gain stage 18 may be implemented as one or more closed-loop or open-loop op-amp circuits or devices capable of boosting the power level of the LP optical input signal 11P to a level sufficient for transmission to a downstream recipient, in this case the remote node N3. For instance, the HP optical signal 200HP in the form of a laser beam would propagate in free space. Amplification is performed in a suitable gain medium of the gain stage(s) 18, e.g., by optically pumping the gain medium with one or more lasers.

The PM stage 20 downstream of the gain stage(s) 18 in turn is configured to output a high-power ("HP") optical output signal 200HP and an LP optical signal 200LP in response to the amplified output signal 11P*. The PM stage 20 may be optionally embodied as a PM tap coupler. As understood in the art, a PM tap coupler is operable for dividing input light into two output fibers while maintaining the polarization state of the input light, in this case the amplified output signal 11P*. Commercially-available devices provide for low loss and back reflection, with a high extinction ratio and a predetermined split ratio, thus allowing the PM stage 20 to pass most of the power of the amplified output signal 11P* to the remote node N3, e.g., via the optical telescope A2. Alternatively, the PM stage 20 may include a PM wavelength division multiplexer (PM-WDM), with such an embodiment providing a capability of separating different output frequencies.

Within the scope of the disclosure, therefore, a majority of the total power level of the amplified optical signal 11P* is allocated by the PM stage 20 to the HP optical output signal 200HP, with a small portion of power of the amplified output signal 11P* being allocated to the LP optical signal 200LP. While the term "majority" as used herein entails more than 50-percent of the total power level, contemplated space-borne applications of the optical communication network 10 shown in FIG. 1 could allocate substantially all of the total power level of the amplified optical signal 11P* to the HP optical output signal 200HP, e.g., at least about 95 percent of the total power level. The low remaining power level is used to control the state of the polarization rotator device 16 as set forth below, via operation of the ECU 25.

Downstream of the PM stage 20, a polarization splitter 22 receives the LP optical output signal 200LP as an input, and in response, transmits the LP optical signal 200LP along the slow polarization axis 220S, the fast polarization axis 220F, or both depending on the application and application-based control settings. As appreciated in the art, "slow axis" and "fast axis" refer to the two polarization modes in a typical fiber-based optical circuit. In general, and as "slow" and "fast" imply, light phase velocity propagates more slowly along the slow axis relative to the fast axis, which is due largely to fiber birefringence.

The polarization splitter 22 in general is configured to transmit fixed linear polarization along either the slow polarization axis 220S or the fast polarization axis 220F. However, as noted below the ECU 25 is operable for controlling power levels of the polarization splitter 22 along the slow and fast polarization axes 220S and 220F, respectively. For instance, if slow axis power is set to zero, i.e., essentially no output is provided along the slow polarization axis 220S, then the output of the polarization splitter 22 is solely along the fast polarization axis 220F. The ECU 25 could similarly control the output of the polarization splitter 22 such that some of the power is provided on both axes 220S and 220F. In practical terms, however, the ECU 25 will typically command output power on just one of the axes 220S or 220F. In an alternative implementation, the ECU 25 can time windowed control along axes 220S and/or 220F for fast optical polarization switching output.

Additional components of the OHPA circuit 150 include first and second photodetectors 23A and 23B, respectively. In an exemplary configuration, the first and second photodetectors 23A and 23B may be configured as photodiodes, e.g., PIN, metal-semiconductor-metal (MSM), or as phototransistors or another suitable device having application-suitable response times. The first photodetector 23A is arranged on the slow polarization axis 220S, while the second photodetector 23B is arranged on the fast polarization axis 220F. The respective first and second photodetectors 23A and 23B are configured to output corresponding first and second electrical signals 230A and 230B in response to the LP optical signal 200LP from the polarization splitter 22. Thus, the first and second electrical signals 230A and 230B, e.g., voltage or current signals, are transmitted or communicated to the ECU 25 as control signals in the context of ultimately controlling a targeted polarized output state of the polarization rotator device 16.

Still referring to FIG. 2, the ECU 25 is configured to output the polarizer control signal $CC_{16}$ to the polarization rotator device 16 in response to at least one of the first or second electrical signals 230A and/or 230B to thereby command the polarization rotator device 16 to output the optical signal 11P with the aforementioned targeted polarized output state. While the OHPA circuit 150 may maintain a fixed polarized state in one or more embodiments, e.g., as a default state, the ECU 25 may also be operable for selectively changing or modifying the fixed polarized state as needed. For instance, the ECU 25 may be programmed in software and equipped in hardware, i.e., configured, to selectively modify the default fixed polarized output state in response to a switching state selection signal ($CC_{25}$). Thus, the polarized output state of the polarization rotator device 16 may be fixed or variable in different implementations, with the variable state providing added security benefits and other possible advantages.

The ECU 25 for its part operates as a process controller, and may be embodied as one or more computer systems configured to execute computer-readable instructions embodying a method 50, a non-limiting exemplary embodiment of which is described below with reference to FIG. 3. As contemplated herein, the ECU 25 may be implemented as, e.g., a microcontroller, one or more Application Specific Integrated Circuit(s) (ASICs), Field-Programmable Gate Array (FPGAs), electronic circuits, central processing units (CPUs), and associated transitory and non-transitory memory/storage component(s).

The ECU 25 is depicted schematically for illustrative simplicity as having memory (M) 52 and a processor (Pr) 54 of one or more of the above-summarized types. The memory 52 may include non-transitory memory or tangible storage devices, e.g., read only memory, programmable read only memory, solid-state memory, random access memory, optical and/or magnetic memory, etc. Memory 52, on which computer-readable instructions embodying the method 50 may be recorded and from which such instructions may be executed by the processor(s) 54, may store machine-readable code/instructions as software or firmware programs. Other hardware components of the ECU 25 are omitted for simplicity but well understood in the art, including but not limited to combinational logic circuits, input/output (I/O) circuits, digital and analog signal conditioning/buffer circuitry, and other components that may be accessed as needed by the processor(s) 54 to provide the functionality described herein.

Figure 3:
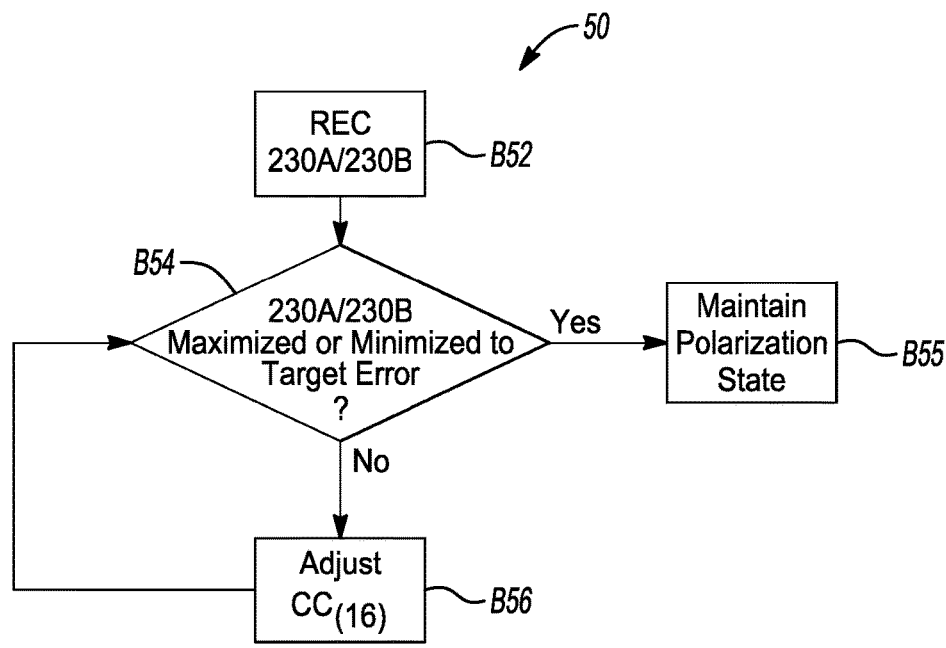
FIG. 3 is a flow chart describing a method for controlling the OPHA circuit of FIG. 2 when communicating between nodes of an optical communication network in accordance with the disclosure.

Referring now to FIG. 3, the method 50 for controlling the OHPA circuit 150 of FIG. 2 is shown in flowchart form in accordance with a non-limiting exemplary embodiment. The flowchart of FIG. 3 in turn is depicted as a series of terminal or logic blocks, with the term "block" as used herein referring to a discrete step, subroutine, or code sequence of the method 50.

Beginning with block B52 ("REC 230/230B"), the method 50 includes receiving the first and/or second electrical signals 230A and/or 230B, respectively via the ECU 25. The method 50 then proceeds to block B54 ("230A/230B Maximized or Minimized to Target Error?").

At block B54, the ECU 25 determines if the first electrical signal 230A is maximized or within a target maximized error. If so, most if not all of the power of the HP optical signal 200HP polarization is aligned to the slow axis. The method 50 then proceeds to block B55 ("Maintain Polarization State.") If however the first electrical signal 230A is not within target maximixation error, at least some of the power from the HP optical signal 200HP polarization is aligned to the fiber fast axis. The method 50 proceeds in this instance to block B56 ("Adjust $CC_{16}$").

At block B56, the ECU 25 adjusts the polarizer control signal $CC_{16}$ so as to rotate the polarization rotator device 16, thereby modifying its output state to repeat the process of maximizing power along the fiber slow axis. Alternatively, the ECU 25 may minimize output power along the slow axis.

For fast switching of the HP optical signal 200HP polarization, the first electrical signal 230A can be time window-selected to maximize or minimize the signal 200HP power in one polarization state. Similar to the first electrical signal 230A, the second electrical 230B can also be used as an input to the ECU 25.

The method 50 in its various implementations is operable for controlling the OHPA circuit 15, 150 aboard a communication node (N2) of the optical communication network 10. Method 50 could include outputting the amplified optical signal 11P* having a total power level, via the fiberoptic gain stage 18 of the OHPA circuit 15, 150, in response to the LP optical input signal 11, 11P. The method 50 may also include transmitting the HP optical output signal 200HP and the LP optical output signal 200LP, via PM stage 20, in response to the amplified output signal 11P*, such that a majority of the total power level is allocated to the HP optical output signal 200HP. Additionally, the method 50 may include transmitting the LP optical output signal 200LP, via polarization splitter 22, along the slow polarization axis 220S and/or the fast polarization axis 220F, and outputting the corresponding first and second electrical signals 230A, 230B in response to the LP optical output signal 200LP via the respective first and second photodetectors 23A, 23B arranged on the slow polarization axis 220S and the fast polarization axis 220F. The ECU 25 may, in response to at least one of the first or second electrical signals 230A, 230B, command the polarization rotator device 16 to output the LP optical input signal 11P with a targeted polarized output state.

To assist and clarify the description of various embodiments, various terms are defined herein. Unless otherwise indicated, the following definitions apply throughout this specification (including the claims). Additionally, all references referred to are incorporated herein in their entirety. "A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The OHPA circuit 150 and the method 50 as described above with respective reference to FIGS. 2 and 3 may be configured and operated in a manner tailored to the desired application, and thus the foregoing description is illustrative of the present teachings and non-limiting thereof. Unlike systems that start with a polarized amplifier, for instance, the present OPHA circuit 150 may commence with non-polarization maintaining gain stages 18. The OPHA circuit 150 is able to amplify both orthogonal polarizations as noted above, as opposed to just one. Importantly to certain applications, the input signals to the OPHA circuit 150 need not be at the wavelength or the same polarization. Moreover, the disclosed OPHA circuit 150 in its possible implementations is able to handle characteristically high levels of optical power. As appreciated in the art, the output of a optical high-power circuit such as the disclosed OHPA circuit 150 of FIG. 2 can be many times brighter than the surface of the Sun. This would typically burn a polarization rotator that is placed in its typical location at the output of the amplifier circuit. Thus, the arrangement described in detail herein and controlled according to the present method 50 may be used in a host of high-power optical applications, as will be appreciated by those skilled in the art in light of the foregoing disclosure.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The following Clauses provide example configurations of a system and method for providing high-power optical amplification in accordance with the disclosure, as shown in the exemplary scenario of FIGS. 1-3 and disclosed herein.

Clause 1: An optical high-power amplifier ("OPHA") circuit, comprising: a fiberoptic gain stage configured, in response to a low-power ("LP") optical input signal, to output an amplified optical signal to a remote node, the amplified optical signal having a total power level; a polarization maintenance ("PM") stage configured to output a high-power ("HP") optical output signal and a low-power ("LP") optical output signal in response to the amplified optical signal, such that a majority of the total power level is allocated to the HP optical output signal; a polarization splitter device configured to transmit the LP optical output signal along a slow polarization axis and/or a fast polarization axis; a first photodetector and a second photodetector arranged on the slow polarization axis and the fast polarization axis, respectively, and configured to output a corresponding first electrical signal and a second electrical signal in response to the LP optical output signal; and an electronic control unit ("ECU") configured to output a polarizer control signal to a polarization rotator device in response to at least one of the first electrical signal or the second electrical signal to thereby command the polarization rotator device to output the optical input signal with a targeted polarized output state.

Clause 2: The OPHA circuit of clause 1, wherein the fiberoptic gain stage is configured to receive the LP optical input signal from an external modulator or an external laser.

Clause 3: The OPHA circuit of either of clauses 1 or 2, wherein the PM stage includes a PM tap coupler.

Clause 4: The OPHA circuit of either of clauses 1 or 2, wherein the PM stage includes a PM wavelength division multiplexer (PM-WDM).

Clause 5: The OPHA circuit of any of clauses 1-4, wherein the OPHA circuit is configured as a communication node of an optical communication network, and the remote node is configured as another communication node of the optical communication network.

Clause 6: The OPHA circuit of clauses 5, wherein the optical communication network is a spaceborne or orbiting communication network, and wherein the communication node and the remote node are located aboard respective satellites of the spaceborne or orbiting communication network.

Clause 7: The OPHA circuit any of clauses 1-6, wherein the ECU is configured to output the polarizer control signal as voltage or current control signals using the first electrical signal as a default input signal, and selectively using the second electrical signal in response to an error in or lack of availability of the first electrical signal.

Clause 8: The OPHA circuit of any of clauses 1-7, wherein the targeted polarized output state includes a default fixed polarized state.

Clause 9: The OPHA circuit of clause 8, wherein the ECU is configured to selectively modify the default fixed polarized output state in response to a switching state selection signal or via pre-programming of the ECU.

Clause 10: The OPHA circuit of any of clauses 1-9, further comprising the the polarization rotator device.

Clause 11: A method for controlling an optical high-power amplifier ("OHPA") circuit aboard a communication node of an optical communication network, comprising: outputting an amplified optical signal having a total power level, via a fiberoptic gain stage of the OHPA circuit, in response to a low-power ("LP") optical input signal; transmitting a high-power ("HP") optical output signal and an LP optical output signal, via a polarization maintenance ("PM") stage in response to the amplified output signal, such that a majority of the total power level is allocated to the HP optical output signal; transmitting the LP optical output signal, via a polarization splitter, along a slow polarization axis and/or a fast polarization axis; outputting corresponding first and second electrical signals response to the LP optical output signal via respective first and second photodetectors arranged on the slow polarization axis and the fast polarization axis; and commanding, via an electronic control unit ("ECU") in response to at least one of the first or second electrical signals, a polarization rotator device to output the LP optical input signal with a targeted polarized output state.

Clause 12: The method of clause 11, wherein transmitting the HP optical output signal includes controlling a state of the PM stage such that the majority of the total power level is at least about 95 percent of the total power level.

Clause 13: The method of either of clauses 11 or 12, further comprising: receiving the optical input signal from an external modulator or an external laser.

Clause 14: The method of any of clauses 11-13, wherein the OPHA circuit includes the polarization rotator device, further comprising: receiving the optical input signal from the external modulator or the external laser via the polarization rotator device.

Clause 15: The method of any of clauses 11-14, wherein the PM stage includes a PM tap coupler, and wherein transmitting the HP optical output signal and the LP optical output signal occurs using the PM tap coupler.

Clause 16: The method of any of clauses 11-14, wherein the PM stage includes a PM wavelength division multiplexer ("PM-WDM"), and wherein transmitting the HP optical output signal and the LP optical output signal occurs using the PM-WDM.

Clause 17: The method of any of clauses 11-16, further comprising: using the OPHA circuit aboard a satellite of a spaceborne or orbiting communication network.

Clause 18: The method of any of clauses 11-17, further comprising: outputting a polarizer control signal via the ECU to the polarization rotator device using the first electrical signal as a default input signal; and temporarily outputting the polarizer control signal via the ECU to the polarization rotator device using the second electrical signal in response to an error in or lack of availability of the first electrical signal.

Clause 19: The method of any of clauses 11-18, further comprising: selectively modifying the targeted polarized output state via the ECU in response to a switching state selection signal or via pre-programming of the ECU.

Clause 20: A satellite comprising: a satellite body; and an OPHA circuit connected to the satellite body, the OPHA circuit comprising: a polarization rotator device; a fiberoptic gain stage configured to receive a low-power ("LP") optical input signal from an external modulator or laser, and in response to the LP optical input signal, to output an amplified optical signal having a total power level, wherein the fiberoptic gain stage is configured to receive the optical input signal from an external modulator or an external laser; a polarization maintenance ("PM") stage configured to output a high-power ("HP") optical output signal and a low-power ("LP") optical output signal in response to the amplified output signal, such that a majority of the total power level is allocated to the HP optical output signal, the PM stage including a PM tap coupler or a PM wavelength division multiplexer (PM-WDM); a polarization splitter configured to transmit the LP optical output signal along a slow polarization axis and/or a fast polarization axis; first and second photodetectors arranged on the slow polarization axis and the fast polarization axis, respectively, and configured to output corresponding first and second electrical signals in response to the LP optical output signal; and an ECU configured to output a polarization control signal to the polarization rotator device using the first electrical signal as a default input signal, and using the second electrical signal in response to an error in or a lack of availability of the first electrical signal, to thereby command the polarization rotator device to output the LP optical input signal with a targeted polarized output state, wherein the ECU is configured to selectively modify the targeted polarized output state.

While various embodiments have been described, the description is intended to be exemplary, rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. An optical high-power amplifier ("OHPA") circuit, comprising:
   a fiberoptic gain stage configured, in response to a low-power ("LP") optical input signal, to output an amplified optical signal to a remote node, the amplified optical signal having a total power level;
   a polarization maintenance ("PM") stage configured to output a high-power ("HP") optical output signal and a low-power ("LP") optical output signal in response to the amplified optical signal, such that a majority of the total power level is allocated to the HP optical output signal;
   a polarization splitter configured to transmit the LP optical output signal along a slow polarization axis and/or a fast polarization axis;
   a first photodetector and a second photodetector arranged on the slow polarization axis and the fast polarization axis, respectively, and configured to output a corresponding first electrical signal and a second electrical signal in response to the LP optical output signal; and
   an electronic control unit ("ECU") configured to output a polarizer control signal to a polarization rotator device in response to at least one of the first electrical signal or the second electrical signal to thereby command the polarization rotator device to output the LP optical input signal with a targeted polarized output state.

2. The OHPA circuit of claim 1, wherein the fiberoptic gain stage is configured to receive the LP optical input signal from an external modulator or an external laser.

3. The OHPA circuit of claim 1, wherein the PM stage includes a PM tap coupler.

4. The OHPA circuit of claim 1, wherein the PM stage includes a PM wavelength division multiplexer (PM-WDM).

5. The OHPA circuit of claim 1, wherein the OHPA circuit is configured as part of a communication node of an optical communication network, and the remote node is configured as another communication node of the optical communication network.

6. The OHPA circuit of claim 5, wherein the optical communication network is a spaceborne or orbiting communication network, and wherein the communication node and the remote node are located aboard respective satellites of the spaceborne or orbiting communication network.

7. The OHPA circuit of claim 1, wherein the ECU is configured to output the polarizer control signal as voltage or current control signals using the first electrical signal as a default input signal, and selectively using the second electrical signal in response to an error in or lack of availability of the first electrical signal.

8. The OHPA circuit of claim 1, wherein the targeted polarized output state includes a default fixed polarized state.

9. The OHPA circuit of claim 8, wherein the ECU is configured to selectively modify the default fixed polarized state in response to a switching state selection signal or via pre-programming of the ECU.

10. The OHPA circuit of claim 1, further comprising:
the polarization rotator device.

11. A method for controlling an optical high-power amplifier ("OHPA") circuit aboard a communication node of an optical communication network, comprising:
outputting an amplified optical signal having a total power level, via a fiberoptic gain stage of the OHPA circuit, in response to a low-power ("LP") optical input signal;
transmitting a high-power ("HP") optical output signal and an LP optical output signal, via a polarization maintenance ("PM") stage in response to the amplified optical signal, such that a majority of the total power level is allocated to the HP optical output signal;
transmitting the LP optical output signal, via a polarization splitter, along a slow polarization axis and/or a fast polarization axis;
outputting corresponding first and second electrical signals in response to the LP optical output signal via respective first and second photodetectors arranged on the slow polarization axis and the fast polarization axis; and
commanding, via an electronic control unit ("ECU") in response to at least one of the first or second electrical signals, a polarization rotator device to output the LP optical input signal with a targeted polarized output state.

12. The method of claim 11, wherein transmitting the HP optical output signal includes controlling a state of the PM stage such that the majority of the total power level is at least about 95 percent of the total power level.

13. The method of claim 11, further comprising:
receiving the optical input signal from an external modulator or an external laser.

14. The method of claim 13, wherein the OHPA circuit includes the polarization rotator device, further comprising:
receiving the optical input signal from the external modulator or the external laser via the polarization rotator device.

15. The method of claim 11, wherein the PM stage includes a PM tap coupler, and wherein transmitting the HP optical output signal and the LP optical output signal occurs using the PM tap coupler.

16. The method of claim 11, wherein the PM stage includes a PM wavelength division multiplexer ("PM-WDM"), and wherein transmitting the HP optical output signal and the LP optical output signal occurs using the PM-WDM.

17. The method of claim 11, further comprising:
using the OHPA circuit aboard a satellite of a spaceborne or orbiting communication network.

18. The method of claim 11, further comprising:
outputting a polarizer control signal via the ECU to the polarization rotator device using the first electrical signal as a default input signal; and
temporarily outputting the polarizer control signal via the ECU to the polarization rotator device using the second electrical signal in response to an error in or lack of availability of the first electrical signal.

19. The method of claim 11, further comprising:
selectively modifying the targeted polarized output state via the ECU in response to a switching state selection signal or via pre-programming of the ECU.

20. A satellite comprising:
a satellite body; and
an optical high-power amplifier ("OPHA") circuit connected to the satellite body, the OHPA circuit comprising:
a polarization rotator device;
a fiberoptic gain stage configured to receive a low-power ("LP") optical input signal from an external modulator or laser, and in response to the LP optical input signal, to output an amplified optical signal having a total power level, wherein the fiberoptic gain stage is configured to receive the optical input signal from an external modulator or an external laser;
a polarization maintenance ("PM") stage configured to output a high-power ("HP") optical output signal and a low-power ("LP") optical output signal in response to the amplified optical signal, such that a majority of the total power level is allocated to the HP optical output signal, the PM stage including a PM tap coupler or a PM wavelength division multiplexer (PM-WDM);
a polarization splitter configured to transmit the LP optical output signal along a slow polarization axis and/or a fast polarization axis;
first and second photodetectors arranged on the slow polarization axis and the fast polarization axis, respectively, and configured to output corresponding first and second electrical signals in response to the LP optical output signal; and
an electronic control unit ("ECU") configured to output a polarization control signal to the polarization rotator device using the first electrical signal as a default input signal, and using the second electrical signal in response to an error in or a lack of availability of the first electrical signal, to thereby command the polarization rotator device to output the LP optical input signal with a targeted polarized output state, wherein the ECU is configured to selectively modify the targeted polarized output state.

* * * * *